(12) United States Patent
Fukunaga et al.

(10) Patent No.: US 8,028,102 B2
(45) Date of Patent: *Sep. 27, 2011

(54) ELECTRONIC APPARATUS AND METHOD OF CONTROLLING A MEMORY UNIT CONNECTED TO THE SAME

(75) Inventors: Minoru Fukunaga, Kawasaki (JP);
Shinya Kurishima, Hiki-gun (JP); Keiji Okuhata, Ome (JP); Yoshihide Katsuse, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 319 days.

This patent is subject to a terminal disclaimer.

(21) Appl. No.: 12/357,102

(22) Filed: Jan. 21, 2009

(65) Prior Publication Data
US 2009/0138653 A1   May 28, 2009

Related U.S. Application Data

(63) Continuation of application No. 11/088,852, filed on Mar. 25, 2005, now Pat. No. 7,500,025.

(30) Foreign Application Priority Data

Mar. 25, 2004 (JP) ................................ 2004-089475

(51) Int. Cl.
*G06G 3/00* (2006.01)
*G06F 13/00* (2006.01)
(52) U.S. Cl. ............. 710/8; 710/301; 709/217; 711/115
(58) Field of Classification Search ............ 710/2, 8–13, 710/301, 313; 709/217–219; 711/115
See application file for complete search history.

(56) References Cited

U.S. PATENT DOCUMENTS

| | | | |
|---|---|---|---|
| 6,330,634 B1 | 12/2001 | Fuse et al. | |
| 6,505,280 B2 | 1/2003 | Terada et al. | |
| 6,766,417 B1 | 7/2004 | Tanaka et al. | |
| 6,832,273 B2* | 12/2004 | Ray et al. | 710/42 |
| 6,954,815 B2* | 10/2005 | Kondo | 710/305 |
| 6,990,554 B2 | 1/2006 | Iida et al. | |
| 7,185,146 B2* | 2/2007 | Masuyama et al. | 711/115 |
| 7,500,025 B2* | 3/2009 | Fukunaga et al. | 711/115 |
| 2004/0016808 A1 | 1/2004 | Kang | |
| 2006/0143472 A1* | 6/2006 | Feilen et al. | 713/189 |

FOREIGN PATENT DOCUMENTS

| | | |
|---|---|---|
| JP | 6-4191 | 1/1994 |
| JP | 7-320018 | 12/1995 |
| JP | 9-171545 | 6/1997 |
| JP | 11-317068 | 11/1999 |
| JP | 2000-132488 | 5/2000 |
| JP | 2003-30123 | 1/2003 |

* cited by examiner

*Primary Examiner* — Christopher B Shin
(74) *Attorney, Agent, or Firm* — Oblon, Spivak, McClelland, Maier & Neustadt, L.L.P.

(57) ABSTRACT

An electronic apparatus in which a memory unit containing a memory and a controller to access the memory in response to an externally input command can be installed. The electronic apparatus comprises a first acquiring section which acquires identification information from the memory unit, a second acquiring section which, on the basis of the identification information acquired by the first acquiring section, acquires one from a plurality of control programs to control the controller of the memory unit, and a setting section which sets an operating environment so as to apply the control program acquired by the second acquiring section to the process of inputting and outputting data to and from the memory unit.

11 Claims, 7 Drawing Sheets

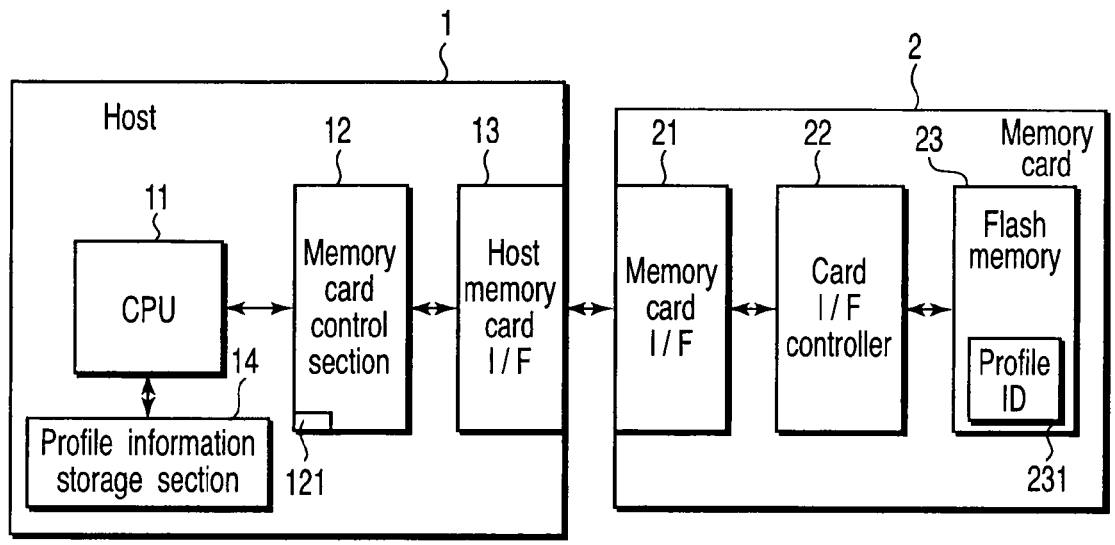

FIG. 1

| Program number | Memory card control program |
|---|---|
| 1 | Company A memory card control program (1) (actual block size, access procedure) |
| 2 | Company A memory card control program (2) (actual block size, access procedure) |
| 3 | Company B memory card control program (1) (actual block size, access procedure) |
| 4 | Company B memory card control program (2) (actual block size, access procedure) |
| 5 | Company B memory card control program (3) (actual block size, access procedure) |

FIG. 2

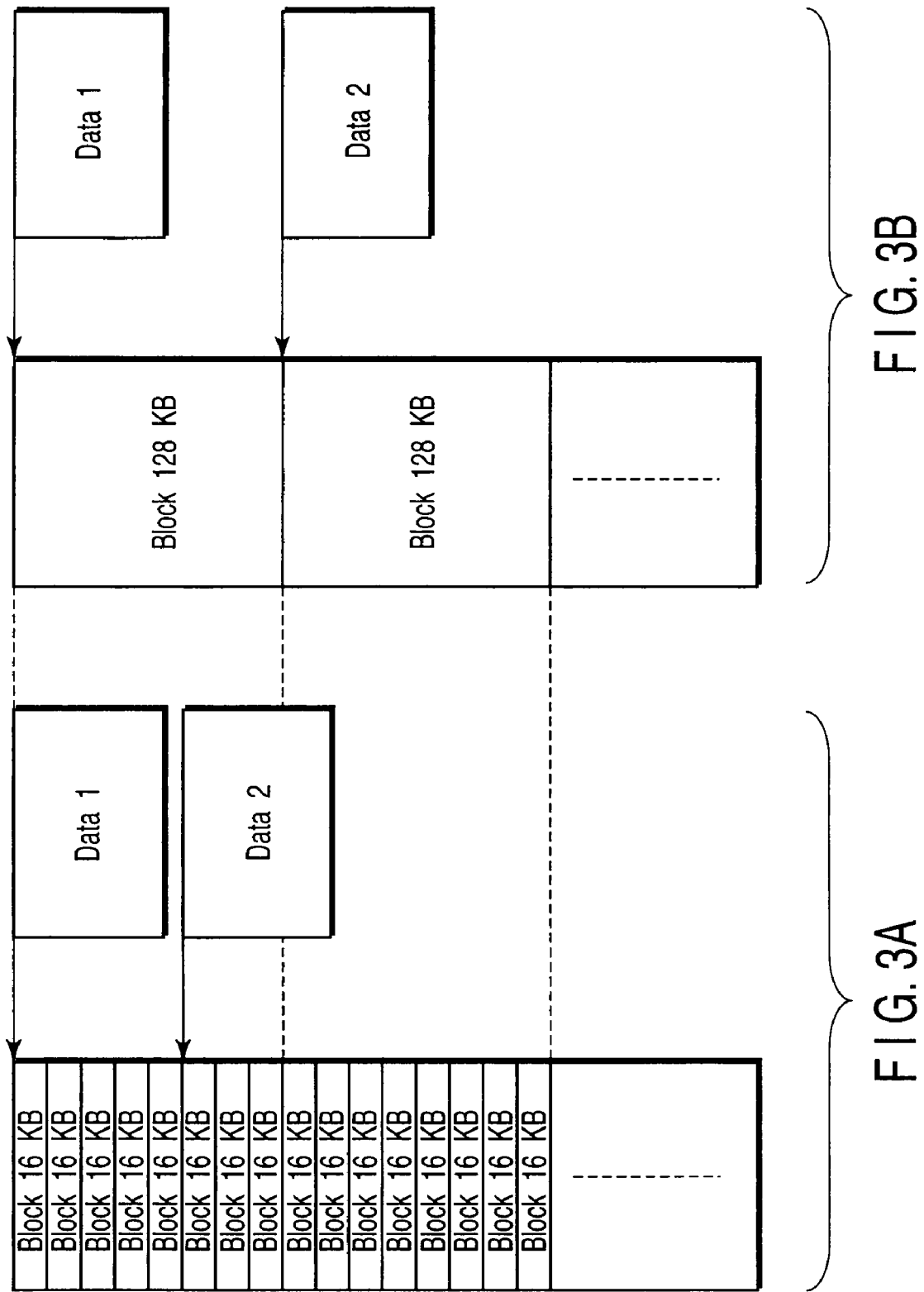

Block A and block B combine
to function as a single block

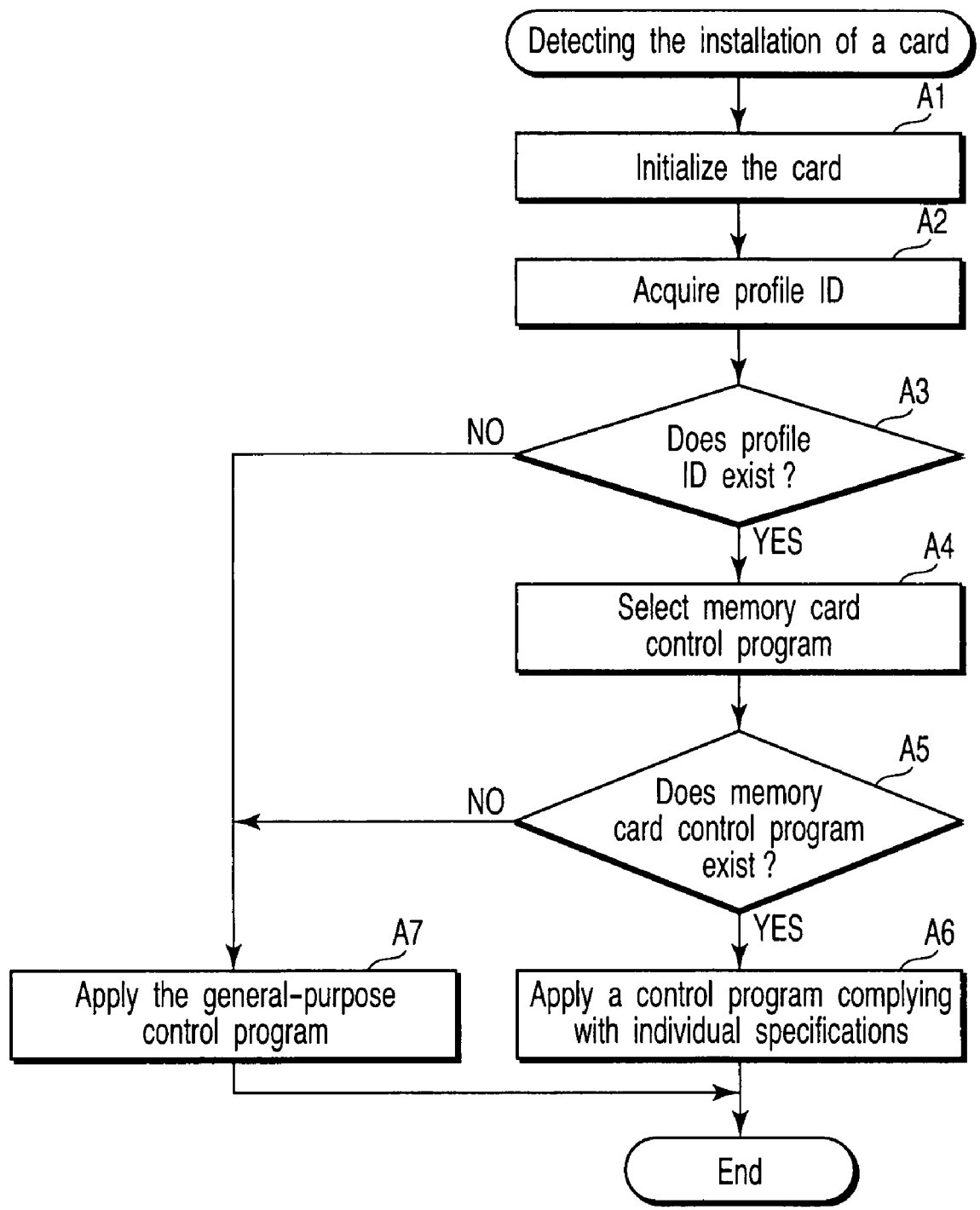
F I G. 7

ELECTRONIC APPARATUS AND METHOD OF CONTROLLING A MEMORY UNIT CONNECTED TO THE SAME

CROSS-REFERENCE TO RELATED APPLICATIONS

This application is a continuation of U.S. application Ser. No. 11/088,852, filed Mar. 25, 2005, and is based upon and claims the benefit of priority from prior Japanese Patent Application No. 2004-089475, filed Mar. 25, 2004, the entire contents of both of which are incorporated herein by reference.

BACKGROUND OF THE INVENTION

1. Field of the Invention

This invention relates to an electronic apparatus acting as a host to which a memory unit with a built-in controller IC, such as a memory card, can be connected and a method of controlling the memory unit.

2. Description of the Related Art

With the recent remarkable progress in semiconductor manufacturing technology, memory cards with a built-in controller IC are getting larger in capacity rapidly. This enables electronic devices acting as hosts to which memory cards are connected, such as digital still cameras or digital video cameras, to handle large-volume content, such as moving images or music.

A host which handles large-volume content is required to finish inputting and outputting data to and from a memory card quickly. That is, faster data transfer between the memory card and the host is considered important. For this reason, a method of setting the data transfer speed to a value suitable for each memory card has been proposed (refer to, for example, Jpn. Pat. Appln. KOKAI Publication No. 7-320018).

In the method disclosed in Jpn. Pat. Appln. KOKAI Publication No. 7-320018, the data transfer between the memory card and the host is carried out at the access speed specified in the access speed information acquired from the memory card. Therefore, even when any type of memory card is installed, the data transfer best suited to the memory card is performed.

As described above, data is always input to or output from the memory card via the controller IC. Therefore, use of only the optimization of the data transfer speed between the memory card and the host makes it difficult to maximize the performance of the memory card.

For example, the specifications of the memory card, including the block size of the memory built in the memory card and the procedure by which the controller IC accesses the memory, differ from maker to maker or depending on the time when the memory card was developed. When data is input and output by a standardized method without recognizing the difference in the specifications, it is possible that a specific command will be often used for the controller IC even though the controller IC is weak in the access procedure based on the specific command or that data writing unsuitable for the block boundary of the memory will be performed frequently. In such a case, even if the data transfer speed between the memory card and the host is optimized, it is difficult to shorten the time required to input and output the data to and from the memory card. Therefore, there has been a desire for an electronic apparatus capable of maximizing the performance of a memory card, taking the specifications of the card into account, and a method of controlling a memory unit connected to the apparatus.

BRIEF SUMMARY OF THE INVENTION

According to a first aspect of the invention, there is provided an electronic apparatus in which a memory unit containing a memory and a controller to access the memory in response to an externally input command can be installed, the electronic apparatus comprising: a first acquiring section which acquires identification information from the memory unit; a second acquiring section which, on the basis of the identification information acquired by the first acquiring section, acquires one from a plurality of control programs to control the controller of the memory unit; and a setting section which sets an operating environment so as to apply the control program acquired by the second acquiring section to the process of inputting and outputting data to and from the memory unit.

According to a second aspect of the invention, there is provided a memory unit with a controller comprising: a memory which stores identification information to determine a control program for the controller; and a transmitting section which, at the request of an external device, transmits the identification information read from the memory to the external device.

According to a third aspect of the invention, there is provided a method of controlling a memory unit in an electronic apparatus in which the memory unit containing a memory and a controller to access the memory in response to an externally input command can be installed, the method comprising: acquiring identification information from the memory unit; selecting one from a plurality of control programs to control the controller of the memory unit, on the basis of the acquired identification information; and setting an operating environment so as to apply the selected control program to the process of inputting and outputting data to and from the memory unit.

BRIEF DESCRIPTION OF THE SEVERAL VIEWS OF THE DRAWING

FIG. 1 schematically shows the configuration of a host and a memory card according to an embodiment of the present invention;

FIG. 2 shows an example of a memory card control program held in the profile information storage section of the host;

FIGS. 3A and 3B are diagrams to explain memory card control, taking into account the actual block size of the memory card executed on the host;

FIG. 7 is a flowchart for the operation procedure for memory card control performed by the host.

DETAILED DESCRIPTION OF THE INVENTION

Figure 4A:
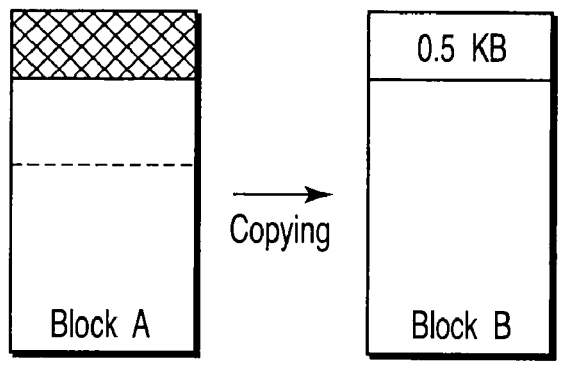
FIGS. 4A to 4C are diagrams to explain first memory card control, taking into account the characteristic for a write command of the memory card executed on the host.

Hereinafter, referring to the accompanying drawings, an embodiment of the present invention will be explained.

FIG. 1 schematically shows the configuration of a host 1 and a memory card 2. The host 1 is a portable terminal, such as a digital still camera, a digital video camera, or PDA (personal Digital Assistant). The host 1 includes a CPU 11, a memory card control section 12, a host memory card interface 13, and a profile information storage section 14.

The CPU 11 controls the overall operation of the host 1. Under the control of the CPU 11, the memory card control section 12 issues various data input and output commands for the installed memory card 2 on the basis of the control procedure prescribed in a memory card control program 121 explained later. The host memory card interface 13 controls the transmission and reception of data and commands between the memory card 2 and the host on the basis of the instruction given by the memory card control section 12.

The memory card control section 12 has a general-purpose memory card control program 121 which prescribes the control procedure, one of the standard specifications of the memory card 2. The general-purpose memory card control program 121 is applied to the memory card control section 12 in the initial state. The profile information storage section 14, which is composed of, for example, a nonvolatile memory, holds a plurality of memory card control programs meeting separate specifications each of which prescribes the control procedure suitable for the characteristic of a specific memory card 2. That is, the specification of, for example, a card interface controller 22 in the memory card 2 differs from manufacturer to manufacturer, with the result that the access procedure for a flash memory 23 differs from manufacturer to manufacturer. Since there are various actual block sizes of the flash memory 23, it is necessary to hold a plurality of memory card control programs 121 complying with the specifications determined by individual manufacturers.

FIG. 2 shows an example of the memory card control program 121 held in the profile information storage section 14. In this example, two types of memory card control programs compatible with Company A's products and three types of memory card control programs compatible with Company B's products, that is, a total of five types of memory card programs 121, are held in the profile information storage section 14. In addition, data corresponding to the actual block size of the flash memory are held so as to correspond to the respective memory card control programs. That is, the host 1 is set so as to be capable of maximizing the performance of each of the five types of memory cards manufactured by Company A and Company B, according to the memory card control programs held in the profile information storage section 14. This will be explained later.

The memory card 2 includes a memory card interface 21, a card interface controller 22, and a flash memory 23.

The memory card interface 21 controls the trans-mission and reception of commands and data between the memory card 2 and the host memory card interface 13 of the host 1. In response to the command received from the host 1 via the memory card interface 21, the card interface controller 22 accesses the flash memory 23 and returns the result to the host 1 via the memory card interface 21.

The flash memory 23, which is composed of, for example, NAND EEPROM cells, is a storage medium which stores various contents, including still images, moving images, and music. In the flash memory 23, a profile ID 231 is stored. The profile ID 231 is composed of, for example, a type number which enables the type of the memory card 2 to be identified. The profile ID 231 is stored in, for example, a Vendor Unique information description area all of the memory cards have. The profile ID 231 has been caused to correspond to the program number of the memory card control program 121 held in the profile information storage section 14 of FIG. 2.

In the host 1 and memory card 2 configured as described above, the memory card 2 is installed in the host 1 whose power supply is on or the power supply of the host 1 is turned on, with the memory card 2 installed in the host. Then, in the host 1, the CPU 11 detects the installation of the memory card 2 and initializes the memory card 2 to make the card 2 readable and writable.

After the memory card 2 has been initialized, the CPU 11 instructs the memory card control section 12 to acquire the profile ID 231 from the memory card 2. Receiving the instruction, the memory card control section 12 issues a command group for reading the profile ID 231 to the memory card 2. Command group issuing control at that time is performed by the general-purpose memory card control program 121 applied in the initial state.

The command group issued from the memory card control section 12 is transferred via the host memory card interface 13 and memory card interface 21 to the card interface controller 22 of the memory card 2. According to the command, the card interface controller 22 reads the profile ID 231 from the flash memory 23. The read-out profile ID 231 is transferred via the memory card interface 21 to the host 1. In the host 1, the profile ID 231 is transferred from the memory card control section 12 to the CPU 11.

The CPU 11 acquires the memory card control program 121 with the program number caused to correspond to the received profile ID 231 from the profile information storage section 14 and transfers the control program 121 to the memory card control section 12. The memory card control section 12 resets the operating environment so as to use the memory card control program 121 transferred from the CPU 11 in place of the general-purpose control program 121 applied in the initial state. From this time on, the memory card control section 12 issues a command group on the basis of the reset memory card control program 121.

When a memory card 2 other than the five types of memory cards manufactured by Company A and Company B has been installed, that is, when a specified profile ID 231 has not been acquired or when the memory card control program 121 with the program number caused to correspond to the acquired program file ID 231 does not exist in the profile information section 14, the CPU 11 continues holding the general-purpose memory card control program 121 applied in the initial state and the memory card control section 12 does not reset the operating environment.

As described above, the memory card control program 121 corresponding to the memory card 2 installed in the host 1 enables the memory card section 12 to be controlled. Next, a concrete example of the specifications of the memory card 2 considered in each of the memory card control programs 121 will be explained.

(1) Actual Block Size (Block Boundary) of the Flash Memory 23

The actual block size (boundary) of the memory card might differ from the value in the specifications, depending on the capacity of the flash memory 23, the performance of the card interface controller 22, or the like. Therefore, if the control procedure making no account of the actual block size is applied in all cases, the performance of the memory card 2 might be impaired seriously.

Suppose a memory card 2 whose actual block size is 128 kilobytes has been installed, although the value of the block size in the specifications is 16 kilobytes. Consider a case where two sets of about 70 kilobytes of data (data 1 and data 2) are written into the memory card 2. FIG. 3A shows a case where two data items are written when the block size is 16 kilobytes, the value in the specifications. FIG. 3B shows an example of writing two data items, taking the actual block size (128 kilobytes) into account.

When the block size has been recognized as 16 kilobytes, the value in the specifications, it is the most common for the memory card control section 12 of the host 1 to write first data 1 using five blocks from the begin block and thereafter write second data 2 using five blocks from the sixth block. In this case, however, the second data is actually written to extend over the end of the begin block and the beginning of the second block. When viewed from the card interface controller 22 of the memory card 2, it is difficult to say that suitable control is performed.

In contrast, when the block size has been recognized as 128 kilobytes, the actual size, the memory card control section 12 of the host 1 tries to write the first data 1 into the begin block and then write the second data 2 into the second block as shown in FIG. 3B. In this case, since data writing is done as required, the card interface controller 22 of the memory card 2 is not forced to do overhead work.

Overhead work will be explained more specifically. In the procedure shown in FIG. 3A, when a request to write data 2 is made, the first block composed of eight blocks including five blocks in which data 1 has been stored is read temporarily. The first half of data 2 is stored in the three blocks of them. Thereafter, the first block is written back. This work is originally unnecessary work and therefore overhead work. After the overhead work is finished, the second half of data 2 is written into the relevant part of the second block. In this way, the performance of the memory card 2 deteriorates seriously.

To overcome this problem, each of the memory card control programs 121 executes the control procedure taking into account the actual block size (block boundary) of the corresponding memory card 2, thereby maximizing the performance of the memory card 2.

(2) The Characteristic of the Card Interface Controller 22 for Write Commands The memory card 2 generally has a card interface controller 22 capable of accepting two data write commands, "single write" and "multi-write", supplied from the host 1. However, if a write command is applied, taking no account of the characteristic of the card interface controller 22, the performance of the memory card 2 can be impaired seriously.

A single write is a command to write one sector of data in one command. A multi-write is a command to write n sectors of data consecutively in one command. Referring to FIGS. 4A to 4C and FIGS. 5A to 5C, two approaches of processing a single write used in the card interface controller 22 will be explained.

Figure 4B:
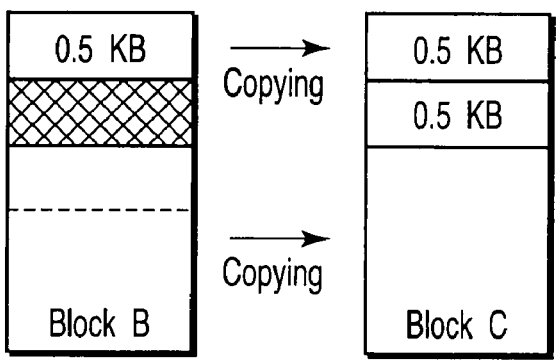
Figure 4C:
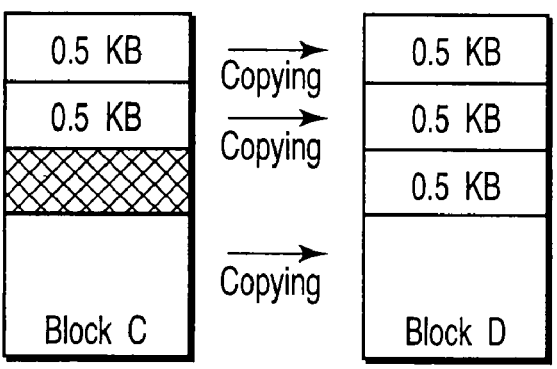

First, referring to FIGS. 4A to 4C, a first single write processing approach will be explained. One sector is assumed to contain 0.5 kilobytes. Consider a case where a block (block A) is overwritten with 1.5 kilobytes, that is, three sectors of data, in a single write. In FIGS. 4A to 4C, the shaded region represents the part to be written into and all of the remaining part represent the part not to be written into.

As shown in FIG. 4A, when a first single write command is received, a first one sector of data is written into a sector of block B corresponding to a sector to be written into of block A. At the same time, all of the data in the sectors not to be written into in block A are copied into block B. That is, a state where one sector of data is overwritten with block A is produced in block B. Thereafter, block A is deleted. Then, as shown in FIG. 4B, when a second single write command is received, a state where the next one sector of data is overwritten with block B is produced in block C. Thereafter, block B is deleted. Then, as shown in FIG. 4C, when a third single write command is received, a state where the next one sector of data is overwritten with block C is produced in block D. Thereafter, block C is deleted. As described above, in the first processing approach, when three sectors of data are written over a block, the block is moved and the data is copied and deleted each time a command is received.

Next, referring to FIGS. 5A to 5C, a second single write processing approach will be explained. In this case, too, one sector is assumed to contain 0.5 kilobytes. Explanation will be given about a case where 1.5 kilobytes, or three sectors of data, are written into a block (block A) in a single write.

Figure 5A:
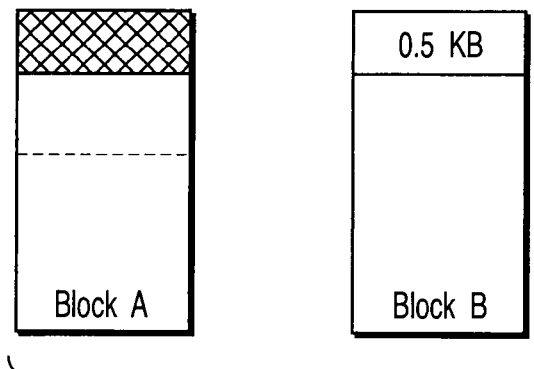
FIGS. 5A to 5C are diagrams to explain second memory card control, taking into account the characteristic for a write command of the memory card executed on the host.
Figure 5B:
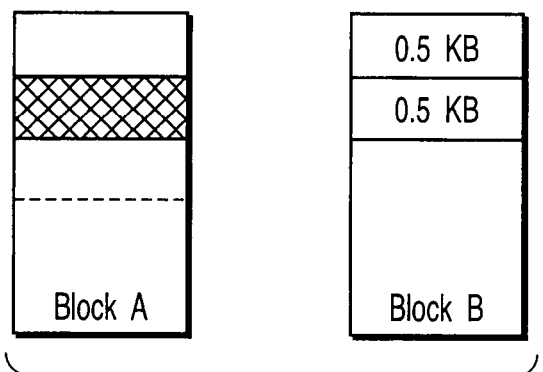
Figure 5C:
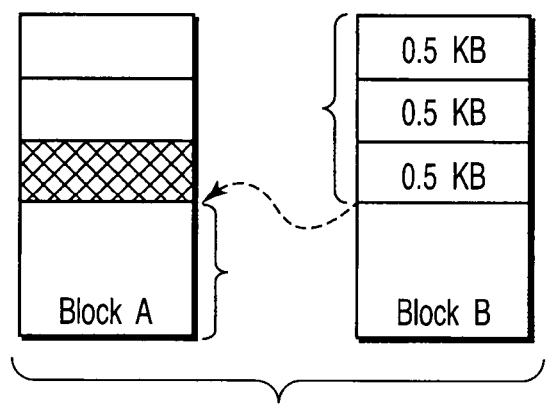

As shown in FIG. 5A, when a first single write command is received, the first one sector of data is written into block B. As long as data is being written into consecutive locations, the block is not moved. As shown in FIGS. 5B and 5C, a second single write command and a third single write command are executed consecutively. The sector to be written into this time in block B and the sector not to be written into in block A are correlated to each other so that these two blocks may function as a single block. One virtual block composed of these two blocks is moved at a time when the block is written into a location discontinuous with the block. As described above, in the second single write processing approach, when three sectors of data are written over a block, the moving (copying and erasing) of the block is not performed.

From what has been described above, it is seen that it is undesirable for the memory control program 121 corresponding to the memory card 2 to write data using "single write" when the card interface controller 22 of the memory card 2 uses the first processing approach in "single write."

Figure 6A:
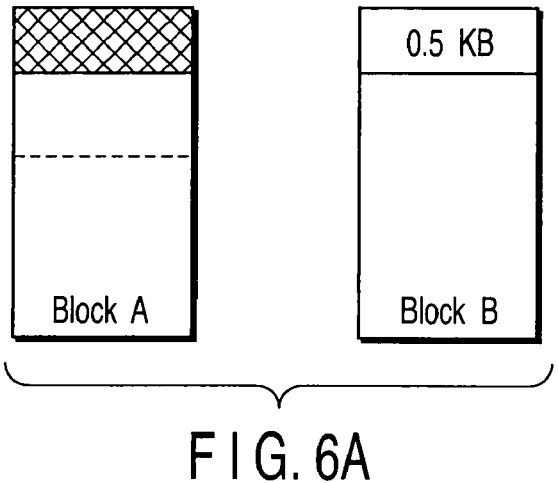
FIGS. 6A to 6C are diagrams to explain third memory card control, taking into account the characteristic for a write command of the memory card executed on the host.
Figure 6B:
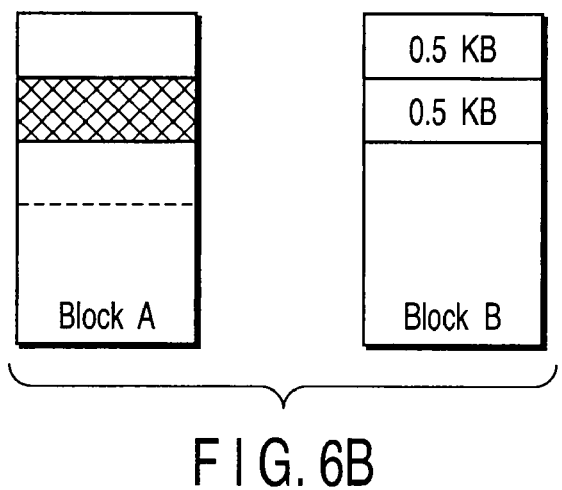
Figure 6C:
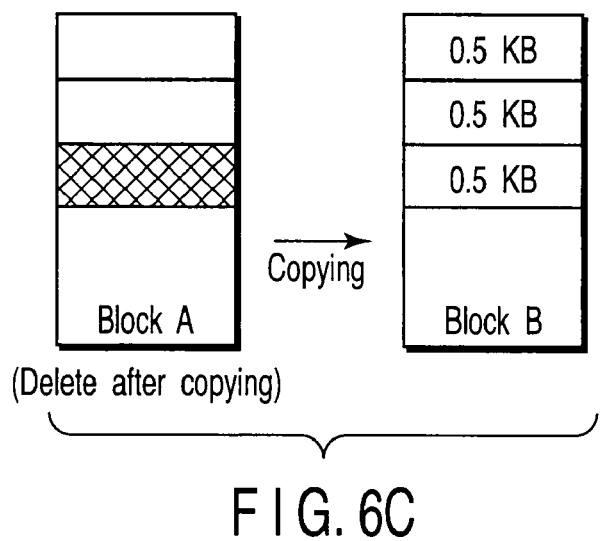

FIGS. 6A to 6C show a general approach of processing "multi-write" in the card interface controller 22 of the memory card 2 using the first processing approach in "single write." In this case, too, one sector is assumed to contain 0.5 kilobytes. Explanation will be given about a case where 1.5 kilobytes, or three sectors of data, are written over a block (block A) in a multi-write.

As shown in FIGS. 6A to 6C, in the case of a multi-write command, all of three sectors of data are written into block B consecutively and then the data in the sectors not to be written into in block A are copied into block B. As a result, a state where three sectors of data have been written over with block A is produced in block B. This makes the block move only once. That is, it is seen that it is desirable that the memory card control program 121 corresponding to the memory card 2 should write data using "multi-write."

Even when receiving a multi-write command under the same conditions, the card interface controller 22 of the memory card 2 using the second processing approach in "single write" generally carries out the same operation as when receiving a single-write command. Specifically, the memory card control program 121 corresponding to the memory card 2 issues a multi-light command, when receiving a multi-write command. In this case, the memory card control program 121 performs complex control, for example, buffering data and writing the buffered data into consecutive locations. However, such control is useless. Therefore, from the viewpoint of load reduction, it is desirable that memory card control 121 corresponding to the memory card 2 use "single write" when receiving a multi-write command.

As described above, the control procedure taking into account the characteristic for write commands of the corresponding memory card 2 is determined in each of the memory card control programs 121, which makes it possible to maximize the performance of the memory card 2.

That is, since the host 1 of the embodiment takes into account the characteristics for the actual block size and write commands in the memory card control program 121 corresponding to each of the five types of memory cards 2 manufactured by Company A and Company B, the performance of each of the memory cards 2 can be maximized.

FIG. 7 is a flowchart to explain the operating procedure for memory card control in the host of the embodiment.

When the memory card 2 is installed, with its power supply on, or when the power supply is turned on, with the memory card 2 installed, the CPU 11 detects that the memory card 2 has been installed in the host 1. When detecting the installation of the memory card 2, the CPU 11 executes an initializing process to make the memory card 2 readable and writable (step A1). Thereafter, the CPU 11 instructs the memory card control section 12 to acquire the profile ID 231 (step A2).

When having acquired the profile ID 231 from the memory card 2 (YES in step A3), the CPU 11 searches the profile information storage section 14 for the memory card control program 121 corresponding to the profile ID 231 (step A4). As a result, if the profile information storage section 14 holds the memory card control program 121 corresponding to the profile ID 231 (YES in step A5), the CPU 11 transfers the card control program 121 to the memory card control section 12, which, from this time on, uses the memory card control program 121 in accessing the memory card 2 (step A6).

On the other hand, if the profile ID 231 has not been acquired in step A3, or if the profile information storage section 14 does not hold the memory card control program 121 corresponding to the profile ID 231 in step A5, the CPU 11 instructs the memory card control section 12 to apply the general-purpose memory card control program 121 (step A7). If the general-purpose memory card control program 121 has been applied in, for example, the initial state at the time of turning on the power supply, the memory card control section 12 keeps the present state in step A7. On the other hand, if the memory card control program 121 complying with any one of the individual specifications has been applied, the operating circumstance of the memory card control section 12 is returned to the initial state to apply the general-purpose memory card control program 121 instead of the present one.

In the host 1 of the embodiment, the profile information storage section 14 holds the memory card control program 121 corresponding to each of the memory cards 2. The profile ID 231 is acquired from the installed memory card 2, thereby selecting the corresponding one of the memory card control programs 121. The memory card control program 121 is then set in the memory card control section 12. This makes it possible to perform data input/output control suitable for each of the memory card specifications, which enables the performance of the memory card to be maximized.

Figure 8:
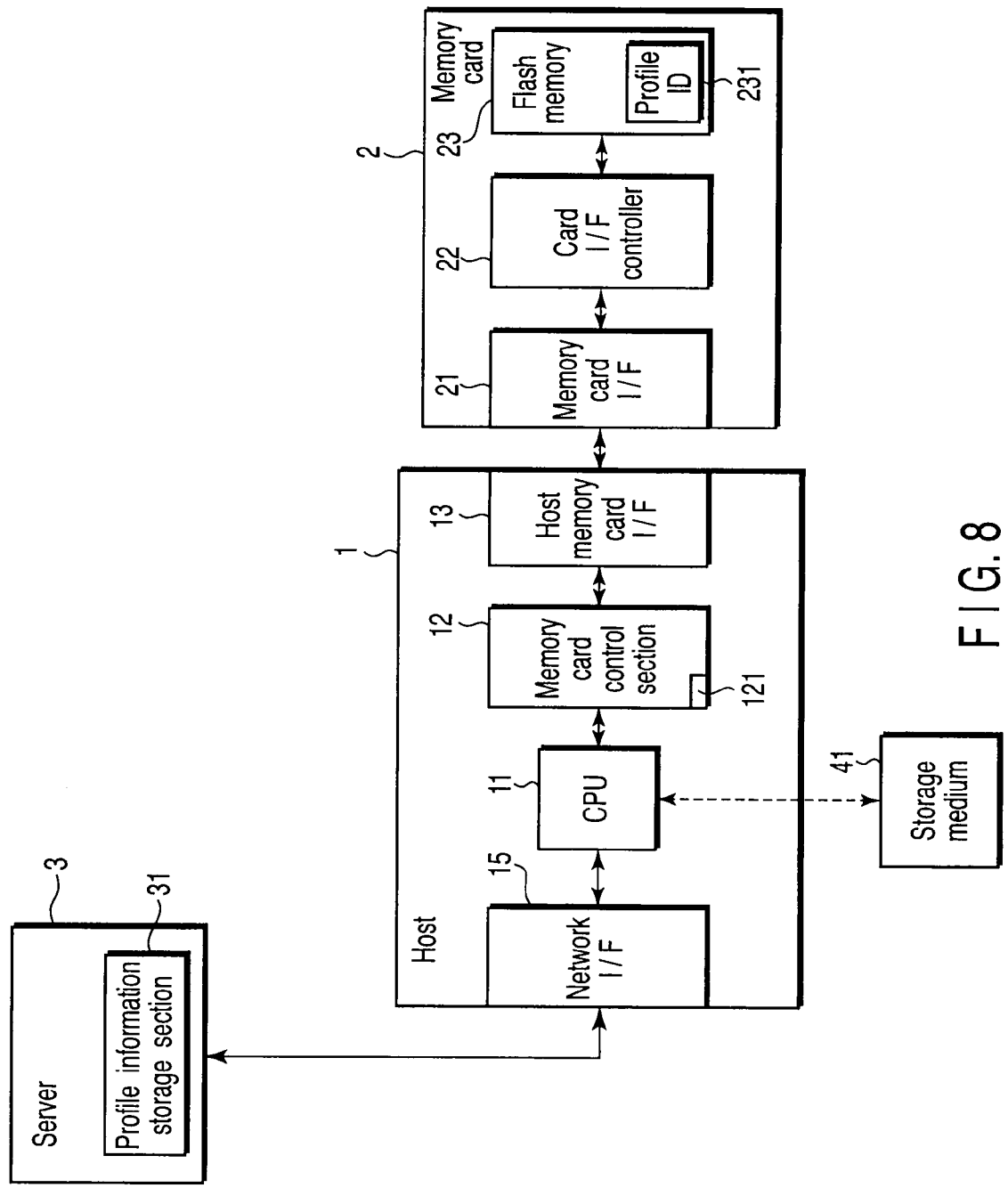
FIG. 8 shows an application of memory card control performed by the host.

In the embodiment, the host 1 has the profile information storage section 14 and causes the profile information storage section 14 to hold the memory card control program 121 corresponding to each of the memory cards 2. However, as shown in FIG. 8, the host 1 does not necessarily have the profile information storage section 14. For instance, the host 1 may have only the function of acquiring the corresponding memory card control program 121 and resetting the program and take in a desired one of the various memory card control programs 121 stored on an optical disk, such as CD-ROM, or another storage medium 41. With this configuration, the memory card control program 121 stored in the storage medium 41 can be updated easily. For example, it is possible to cope easily with a change in the specifications of the memory card 2.

Furthermore, for example, as shown in FIG. 8, a network interface 15 to communicate with a server 3 via a network may be provided in the host 1, a profile information storage section 31 may be provided in the server 3 at a remote location, and the memory card control program 121 may be downloaded from the server 3 via the network interface 15 as needed. With this configuration, the profile information storage section 31 of the server 3 can be shared by a plurality of hosts 1.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An electronic device including a memory unit containing a flash memory and a controller to access the flash memory in response to an externally input command, the electronic device comprising:
   a first section configured to provide identification information of the memory unit;
   a storage section configured to store control programs to control the controller of the memory unit; and
   a second section configured to assign one of the control programs from the storage section on the basis of the identification information of the first section,
   wherein an operating environment of the memory unit is set by the assigned control program for inputting and outputting data to and from the memory unit.

2. The electronic device according to claim 1, wherein the control program includes information corresponding to an actual block size of the memory.

3. The electronic device according to claim 1, wherein the control program includes information corresponding to a procedure by which the controller accesses the memory.

4. The electronic device according to claim 1, wherein the identification information is information to indicate a profile of the memory unit.

5. The electronic device according to claim 1, wherein the memory is a block erase type flash memory.

6. A method of controlling a memory device including a memory unit containing a flash memory and a controller to access the flash memory in response to an externally input command, the method comprising:
   acquiring identification information from the memory unit;
   selecting one from a plurality of control programs to control the controller of the memory unit, on the basis of the acquired identification information; and
   setting an operating environment so as to apply the selected control program to the process of inputting and outputting data to and from the memory unit.

7. The method according to claim 6, wherein the control program includes information corresponding to an actual block size of the memory.

8. The method according to claim 6, wherein the control program includes information corresponding to a procedure by which the controller accesses the memory.

9. The method according to claim 6, wherein the identification information is information to indicate a profile of the memory unit.

10. The method according to claim 6, wherein said plurality of control programs are stored in a storage medium.

11. The method according to claim 6, wherein said plurality of control programs are stored in a server and downloaded via a network.

* * * * *